(12) United States Patent
Ji

(10) Patent No.: US 8,929,926 B2
(45) Date of Patent: Jan. 6, 2015

(54) METHOD AND SYSTEM FOR SUPPORTING MULTIPLE PAGING AREAS

(75) Inventor: Baowei Ji, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 452 days.

(21) Appl. No.: 12/703,009

(22) Filed: Feb. 9, 2010

(65) Prior Publication Data

US 2010/0255860 A1 Oct. 7, 2010

Related U.S. Application Data

(60) Provisional application No. 61/212,025, filed on Apr. 6, 2009.

(51) Int. Cl.
*H04W 68/00* (2009.01)

(52) U.S. Cl.
CPC ................................. *H04W 68/00* (2013.01)
USPC .................... 455/458; 455/404.2; 455/414.2; 455/509; 370/312

(58) Field of Classification Search
USPC ............... 455/456.1, 404.2, 414.2, 458, 509; 370/312
See application file for complete search history.

(56) References Cited

U.S. PATENT DOCUMENTS

| | | | | |
|---|---|---|---|---|
| 2001/0014605 A1* | 8/2001 | Lindvall et al. | ............... | 455/427 |
| 2007/0191031 A1* | 8/2007 | Mohanty et al. | ............... | 455/458 |
| 2007/0218926 A1* | 9/2007 | Zhuang et al. | ................ | 455/466 |
| 2007/0270118 A1* | 11/2007 | Subramanian et al. | ..... | 455/343.2 |
| 2007/0293244 A1 | 12/2007 | Lee et al. | | |
| 2008/0014981 A1 | 1/2008 | Venkatachalam | | |
| 2008/0242341 A1 | 10/2008 | Wu et al. | | |
| 2008/0254814 A1 | 10/2008 | Harris et al. | | |
| 2008/0311933 A1 | 12/2008 | Lim et al. | | |
| 2009/0149185 A1* | 6/2009 | Narasimha | .................... | 455/442 |
| 2010/0035633 A1* | 2/2010 | Park et al. | .................. | 455/456.1 |
| 2010/0167756 A1* | 7/2010 | Park et al. | .................. | 455/456.1 |
| 2011/0312338 A1* | 12/2011 | Park et al. | .................. | 455/456.1 |

FOREIGN PATENT DOCUMENTS

| | | |
|---|---|---|
| KR | 10-2007-0114933 | 12/2007 |
| KR | 10-2008-0110294 | 12/2008 |
| WO | WO 2006/011775 A2 | 2/2006 |

OTHER PUBLICATIONS

International Search Report dated Nov. 9, 2010 in connection with International Application No. PCT/KR2010/002072.
Partial European Search Report dated May 19, 2014 in connection with European Patent Application No. 10159170.9, 6 pages.

\* cited by examiner

*Primary Examiner* — Qun Shen

(57) ABSTRACT

A wireless communication network comprising a plurality of paging controllers capable of communication with a plurality of base stations within a coverage area of the network is provided. At least one of the plurality of paging controllers is configured to assign one or more paging identifications (PG IDs) to a subscriber station within a paging area when the subscriber station requests to enter idle mode, wherein each of the one or more PG IDs is associated with a paging offset, and transmit the one or more PG IDs to a base station in communication with the subscriber station. The subscriber station only monitors the PG ID having a shortest paging offset among the one or more PG IDs.

20 Claims, 6 Drawing Sheets

400

| BS GROUP | PAGING GROUP IDENTIFICATION ASSIGNMENT (IN ORDER OF INCREASING PAGE OFFSET) |
|---|---|
| BS 1-100 | PG ID_1 (PAGING OFFSET = 0), PG ID_3 (PAGING OFFSET = 1) |
| BS 101-200 | PG ID_2 (PAGING OFFSET = 0), PG ID_3 (PAGING OFFSET = 1) |
| BS 201-500 | PG ID_3 (PAGING OFFSET = 1) |

| BS GROUP | PAGING GROUP IDENTIFICATION ASSIGNMENT (IN ORDER OF INCREASING PAGE OFFSET) | PAGING OFFSET INDICATOR |
|---|---|---|
| BS 1-100 | PG ID_1, PG ID_3 | 11 |
| BS 101-200 | PG ID_2, PG ID_3 | 11 |
| BS 201-500 | PG ID_3 | 01 |

FIG. 5

METHOD AND SYSTEM FOR SUPPORTING MULTIPLE PAGING AREAS

CROSS-REFERENCE TO RELATED APPLICATION (S) AND CLAIM OF PRIORITY

The present application is related to U.S. Provisional Patent No. 61/212,025, filed Apr. 6, 2009, entitled "METHOD FOR SUPPORTING MULTIPLE PAGING AREAS FOR ENHANCED POWER SAVING AND REDUCED PAGING OVERHEAD". Provisional Patent No. 61/212,025 is assigned to the assignee of the present application and is hereby incorporated by reference into the present application as if fully set forth herein. The present application hereby claims priority under 35 U.S.C. §119(e) to U.S. Provisional Patent No. 61/212,025.

TECHNICAL FIELD OF THE INVENTION

The present application relates generally to wireless communications and, more specifically, to a method and system for supporting multiple paging areas.

BACKGROUND OF THE INVENTION

The operation of idle mode is described in IEEE 802.16e. Either a mobile station (MS) or a base station (BS) could initiate the idle mode operation using DREG-REQ and DREG-CMD messages, respectively. After an MS has entered the idle mode, the MS uses fixed parameters for the paging cycle, paging offset, paging listening interval and paging unavailable interval. If an MS is paged, the MS re-enters the radio access network using code based ranging and RNG-REQ/RSP messages.

SUMMARY OF TEE INVENTION

A wireless communication network comprising a plurality of paging controllers capable of communication with a plurality of base stations within a coverage area of the network is provided. At least one of the plurality of paging controllers is configured to assign one or more paging identifications (PG IDs) to a subscriber station within a paging area when the subscriber station requests to enter idle mode, wherein each of the one or more PG IDs is associated with a paging offset, and transmit the one or more PG IDs to a base station in communication with the subscriber station. The subscriber station only monitors the PG ID having a shortest paging offset among the one or more PG IDs.

A paging controller is provided. The paging controller is configured to assign one or more paging identifications (PG IDs) to a subscriber station within a paging area when the subscriber station requests to enter idle mode. Each of the one or more PG IDs is associated with a paging offset. The paging controller is also configured to transmit the one or more PG IDs to a base station in communication with the subscriber station. The subscriber station only monitors the PG ID having a shortest paging offset among the one or more PG IDs.

A subscriber station is provided. The subscriber station is configured to receive one or more paging identifications (PG IDs) when the subscriber station requests to enter idle mode. Each of the one or more PG IDs is associated with a paging offset. The subscriber station is also configured to monitor only the PG ID having a shortest paging offset among the one or more PG IDs.

A subscriber station is provided. The subscriber station is configured to start a timer when the subscriber station leaves a first primary paging group assigned to the subscriber station, perform a location update when the timer expires before the subscriber station enters a second primary paging group assigned to the subscriber station, and stop the timer when the subscriber station enters the second primary paging group before the timer expires. The first primary paging group is different from the second primary paging group.

A method of paging a subscriber station is provided. The method comprises paging the subscriber station only in a particular primary paging group, while refraining from paging the subscriber station in other primary paging groups, when the subscriber station is in a primary paging group. The method also comprises paging the subscriber station in a first secondary paging group with a first shortest paging offset, while refraining from paging the subscriber station in primary paging groups, when the subscriber station is in a secondary paging group.

A wireless communication network comprising a plurality of paging controllers capable of communication with a plurality of base stations within a coverage area of the network is provided. At least one of the plurality of paging controllers is configured to page a subscriber station only in a particular primary paging group and refrain from paging the subscriber station in other primary paging groups when the subscriber station is in a primary paging group. The at least one of the plurality of paging controllers is further configured to page the subscriber station in a first secondary paging group with a first shortest paging offset and refrain from paging the subscriber station in primary paging groups when the subscriber station is in a secondary paging group.

A paging controller is provided. The paging controller is configured to page a subscriber station only in a particular primary paging group and refrain from paging the subscriber station in other primary paging groups when the subscriber station is in a primary paging group. The paging controller is further configured to page the subscriber station in a first secondary paging group with a first shortest paging offset and refrain from paging the subscriber station in primary paging groups when the subscriber station is in a secondary paging group.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a table providing information regarding paging group ID assignments according to an embodiment of this disclosure;

FIG. 5 illustrates a table providing information regarding paging group ID assignments along with paging offset indicators according to an embodiment of this disclosure;

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
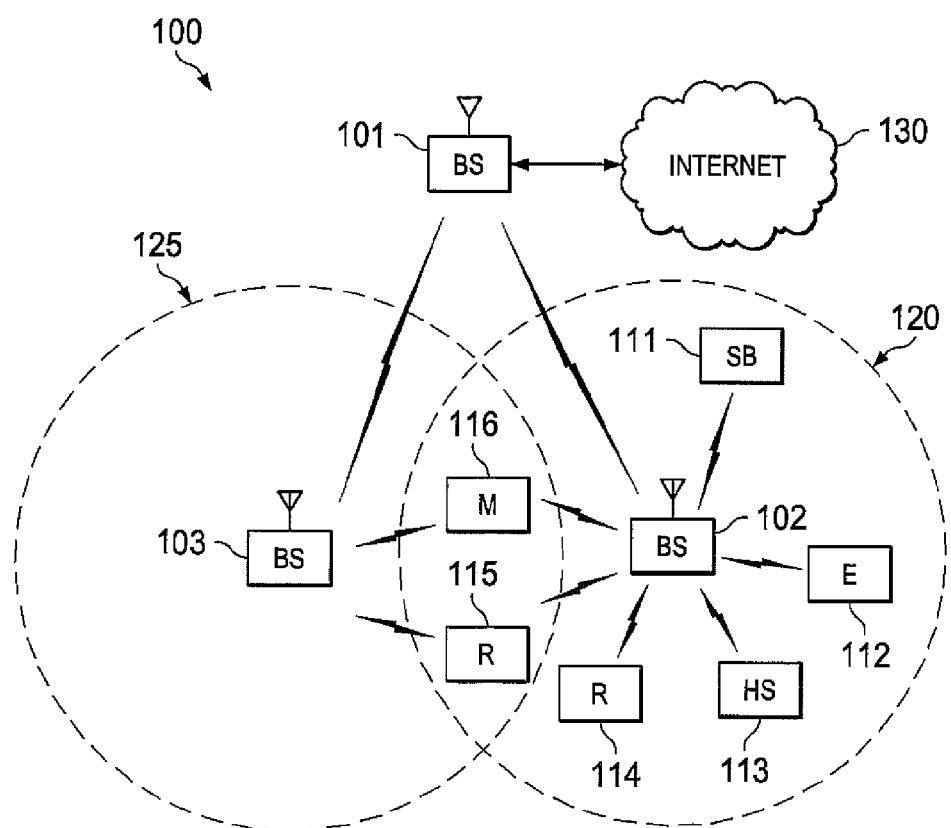
FIG. 1 illustrates an exemplary wireless network, which transmits messages according to the principles of the present disclosure.

FIG. 1 illustrates an exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
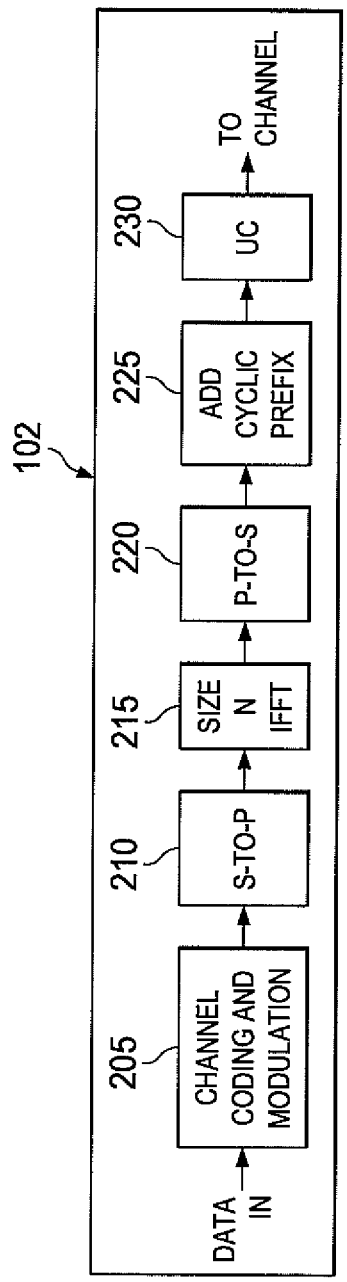
FIG. 2A is a high-level diagram of an OFDMA transmitter according to one embodiment of the present disclosure.
Figure 2B:
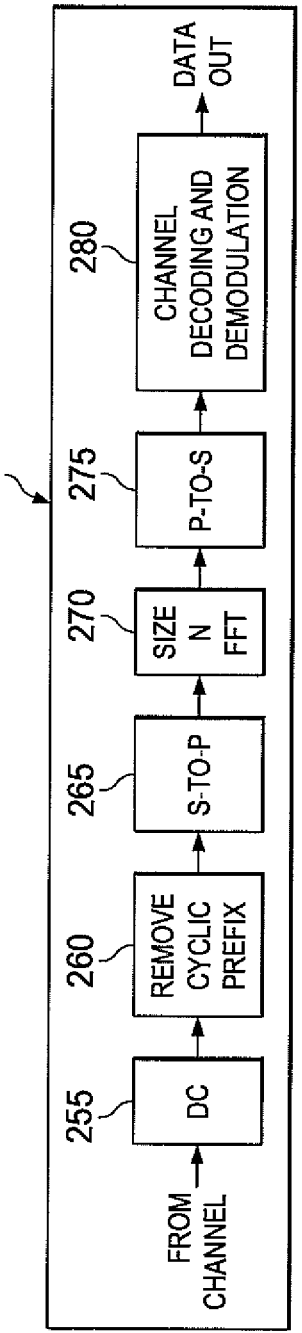
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an EFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

An MS in idle mode is paged by the core network when there is an incoming call for the MS. The MS is not requested to perform a location update or be associated with any BS as long as the MS is moving inside the same paging area. One paging area could consist of hundreds or even thousands of BSs. When the core network needs to page an MS, traditionally all the BSs in the paging area would page the MS. This results in a large paging overhead for all the BSs.

One way of reducing this paging broadcast overhead is by specifying a hierarchical paging structure that consists of two types of paging groups, a large paging and a small paging group. In such a structure, one large paging group covering a large geographical area is divided into a number of small geographical paging groups covering small portions of the large paging group geographical area. Through such a hierarchical paging structure, the paging controller is able to page specific small paging groups for only the intended MS.

Nevertheless, the MS needs to perform a location update to manage the hierarchal paging structure whenever the MS moves to another small paging group. This incurs signaling overhead for a high mobility MS. Hence, to reduce such burden, a high mobility MS within a small paging group changes to the large paging group when the 'small paging group change count' for the MS exceeds a threshold within a predetermined time.

When changing its paging state to a large paging group, the MS stops the location update process. However, the MS does perform a location update at the expiry of a location update timer, hence reducing overhead for location update. Thus, such a hierarchical paging structure may expect an increasing paging load when there are MSs that stay in the large paging group for a long period of time. If 'the BS change count of the MS' drops below a threshold over a long period, this implies a low mobilized or stationary MS. In this case, the MS is allowed to change from a large to a small paging group. Accordingly, the paging load of the network can be reduced.

However, the disadvantage of such a hierarchal paging structure is that smaller paging areas result in more frequent location update. Furthermore, an MS may suffer from ping-pang effect when the paging area gets smaller.

Another way of reducing the paging broadcast overhead is to have the network divide all of the BSs belonging to the same paging group into a number of groups. The network would page the MS through a first group of BSs. If no response is received from the MS, the network would then page the MS again using a next group of BS, and so on. Each page would occur in a different paging cycle. If the MS happens to be in the coverage of the first group of BSs, the paging overhead will be avoided in all the BSs of the remaining groups. If the MS is not in the first groups of BSs, the MS will not be paged again until one or more paging cycles later.

Therefore, the drawback of this approach is the excessive paging delay for many MSs that are not in the first group of BSs or first several groups of BSs.

Another approach to avoiding paging delay is to have all the BS groups, if necessary, finish paging the MS within one paging cycle. When an MS is assigned to more than one paging groups, one of the MS's paging groups is designated as the primary paging group and rest of the assigned paging groups are designated as secondary paging groups.

The disadvantages of this approach are as follows:

(a) It focuses on the distinction between the primary paging group and the second paging groups. However, in many scenarios, the essential for the paging operation is the order in which those groups of BSs conduct paging.

(b) An MS could miss the paging message in some scenarios when the MS is in a primary paging area or a secondary paging area.

(c) It does not specify the behavior when an MS has no primary paging group but multiple secondary paging groups.

(d) It does not support the scenario that an MS could have multiple "primary" paging areas (e.g., one for the housing community where the subscriber lives, one for the office complex where the subscriber works, etc.).

This disclosure provides a method and system for supporting multiple paging areas that balances the instances of MS location update with the paging overhead in a BS.

In the method and system of this disclosure, an MS is assigned multiple paging groups before entering idle mode. Each paging group is associated with a paging group identifier (PG ID) and a paging offset relative to the beginning of each paging cycle.

In one embodiment of this disclosure, the distance between two adjacent paging offset is long enough so that an MS paged in the first paging offset can respond to the network before the transmission of the next paging message at the next paging offset in the same paging cycle begins so that the network avoids any unnecessary paging of the MS in the next paging offset.

In a particular embodiment, when an MS in idle-mode operation moves inside a cell or enters a new cell, if the BS of the cell broadcasts none of the PG IDs that have been assigned to the MS, the MS performs a location update, and the network assigns the MS with a new set of PG ID(s). If the BS of the cell broadcasts one or more of the PG IDs that have been assigned to the MS, the MS monitors the PG ID having shortest paging offset.

This embodiment is different from the previous approach in that the MS does not differentiate between a primary paging group and the secondary paging groups. In this embodiment, the MS monitors only one PG ID that has the shortest paging offset among all the PG IDs assigned to the MS and broadcasted by the current BS.

Figure 3:
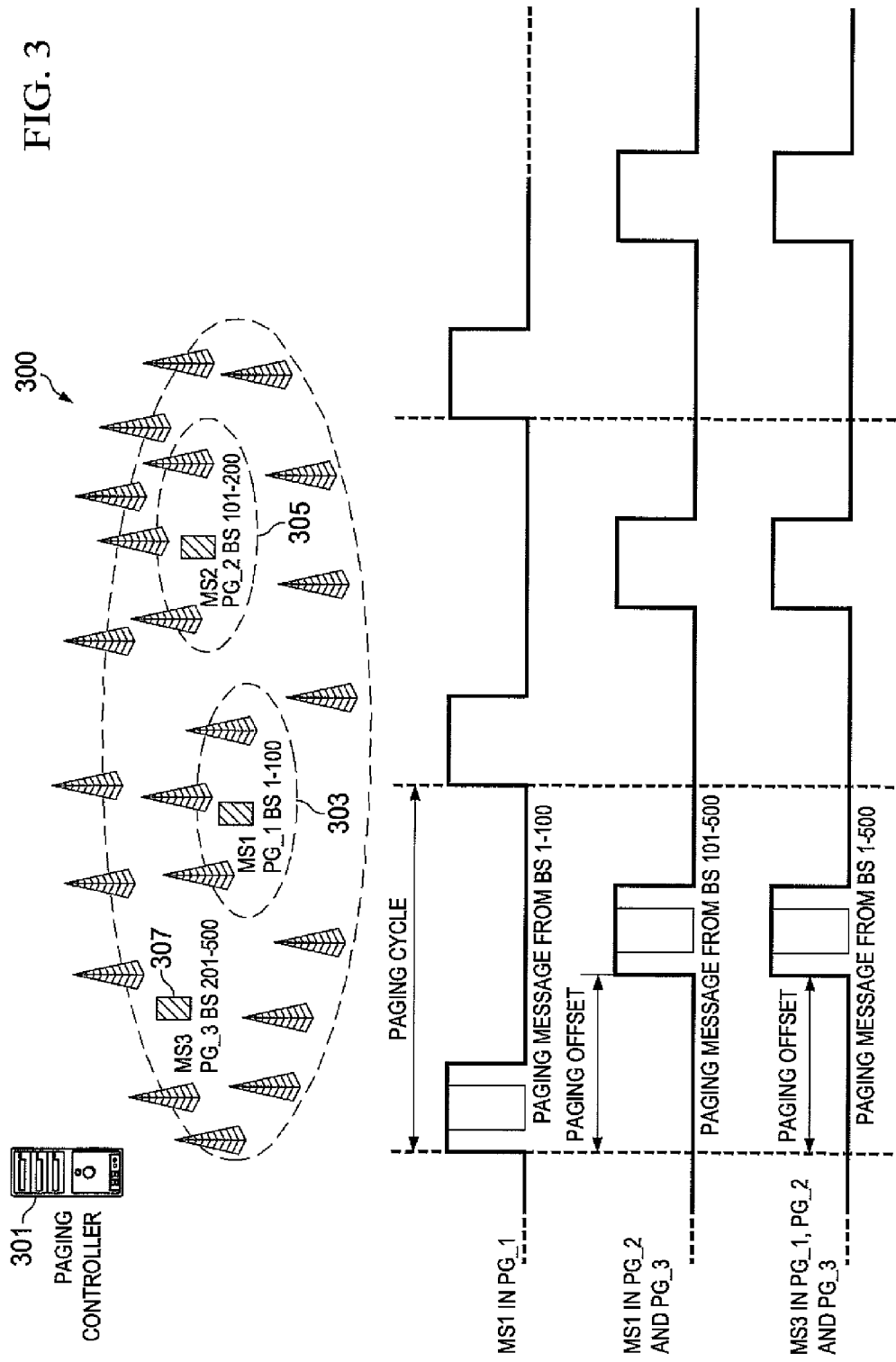
FIG. 3 illustrates a system for supporting multiple paging areas according to an embodiment of this disclosure.

FIG. 3 illustrates a system for supporting multiple paging areas according to an embodiment of this disclosure.

As shown in FIG. 3, a paging controller 301 pages mobile stations in a paging area 300. Paging area 300 comprises a first paging group 303 comprising BS 1-100, a second paging group 305 comprising BS 101-200, and a third paging group 307 comprising BS 201-500. The first paging group 303 carries two PG IDs that include PG ID_1 and PG ID_3, the second paging group 305 carries two PG IDs that include PG ID 2 and PG ID_3, and the third paging group 307 carries one PG ID that includes PG ID_3. MS1 is assigned PG ID_1 and PG ID_3 by the paging controller 301. When MS1 moves into the coverage area of the first paging group 303 and during the time MS1 remains in this coverage area, MS1 only monitors PG ID_1. This is because all the BSs (i.e., BS 1-100) in this paging group carry PG ID_1, and PG ID_1 has the shorter paging offset compared to PG ID_3. When MS1 leaves the first paging group 303 and moves into the second paging group 305 of BS 101-200 or the third paging group 307 of BS 201-500, MS1 only monitors PG ID_3. It does not matter even though the second paging group 305 also carries the shorter PG ID_2 because MS1 has not been assigned PG ID_2.

The situation for MS2 is similar. In this embodiment, MS2 is assigned PG ID_2 and PG ID_3 by the paging controller 301. When MS2 moves into the coverage area of the second paging group 305 of BS 101-200 and during the time MS2 remains in this coverage area, MS2 monitors only PG ID_2 because all the BSs in this paging group carries two PG IDs, and PG ID_2 has the shorter paging offset compared to PG ID_3. When MS2 leaves the coverage area of the second paging group 305 and moves into the coverage area of the first paging group 303 of BS 1-100 or the third paging group 307 of BS 201-500, MS2 only monitors PG ID_3. It does not matter even though the first paging group 303 also carries the shorter PG ID_1 because MS1 has not been assigned PG ID_1.

Both PG ID_1 and PG ID_2 can use the same paging offset because their coverage do not overlap.

In this embodiment, MS3 is assigned only PG ID_3 by the paging controller 301, and as shown in FIG. 3, MS3 only monitors PG ID_3. It does not matter if MS3 is in the first paging group, the second paging group 305, or the third paging group 307.

In another embodiment, the network conducts the paging of an MS through groups of BSs in the order of increasing paging offsets until either the MS has successfully responded to the paging, or all of the paging groups have been exhausted in the current paging cycle. If all of the paging groups have been exhausted in the current paging cycle, the paging will restart in the next paging cycle.

In such an embodiment, the network determines the number of PG IDs having been assigned to the MS. If the MS to be paged is assigned with only one PG ID, then all of the BSs with this PG ID would page the MS in the pre-determined paging offset starting from the beginning of the current paging cycle.

If the MS to be paged is assigned with more than one PG ID, the network determines the PG ID with the shortest paging offset. All of the BSs with this PG ID would then page the MS in the paging offset starting from the beginning of the current paging cycle. If no response is received from the paged MS, the network would then determine the PG ID with the second shortest paging offset, and all of the BSs with this PG ID would then page the MS in the paging offset starting from the beginning of the current paging cycle. If no response is received from the paged MS, the network would continue the paging process in the order of increasing paging offset until all of the PG IDs have been exhausted in the current paging cycle.

This embodiment is different from the previous approach because the network does not differentiate between a primary paging area from secondary paging areas. In this embodiment, the network pages the MS in the order of increasing paging offset in the current paging cycle.

FIG. 4 illustrates a table 400 providing information regarding paging group ID assignments according to an embodiment of this disclosure.

In a further embodiment, the paging controller, BSs and the MS have consistent information regarding the PG ID assignment and paging offset configuration. As shown in table 400, the paging controller, BSs and the MS maintain the consistent configuration of the paging offset.

In a particular embodiment, the paging controller, such as the paging controller 301, informs the MS of the PG ID(s) assigned to it, together with the paging offset configuration for each PG ID. Each BS broadcasts the PG ID(s) it is assigned, and the BS broadcasts the paging message for a PG ID in its pre-determined paging offset in a paging cycle. The MS monitors the PG ID with the shortest paging offset in each cell. The paging controller then pages the MS using the BS groups in the order of increasing paging offset.

FIG. 5 illustrates a table 500 providing information regarding paging group ID assignments along with paging offset indicators according to an embodiment of this disclosure.

Alternatively, each BS broadcasts the PG ID(s) that the BS carries, together with the paging offset indicator as shown in table 500. In this embodiment, the values of all the paging offsets are pre-defined. When an MS enters a cell, the MS detects whether the BS broadcasts any PG ID(s) that have been assigned to the MS. If none was detected, the MS performs a location update. Otherwise, the MS monitors the PG ID with the shortest paging offset.

For example, MS1 is assigned PG ID_1 and PG ID_3 by the paging controller 301. When MS1 moves into the coverage area of the first paging group 303 and during the time MS1 remains in this coverage area, MS1 detects the BSs broadcasting PG ID_1 and PG ID_3 with a Paging Offset Indicator of "11" as shown in table 500. Therefore, the MS1 monitors PG ID_1 at the first paging offset, which by default is zero. When the MS1 enters the second paging group 305, MS1 detects the BSs broadcasting PG ID_2 and PG ID_3 with a Paging Offset Indicator of "11". However, PG ID_2 is not assigned to the MS. Therefore, the MS1 monitors PG ID_3 at the second paging offset. When MS1 is in the third paging group 307, MS1 detects the BSs broadcasting only PG ID_3 with a Paging Offset Indicator of "01". Therefore, the MS1 monitors PG ID_3 at the second paging offset.

In the previous embodiments, there is no differentiation of primary or secondary paging groups. The differentiation was in the order of the paging offsets of the paging groups. In the subsequent embodiments, paging groups are classified into two categories: primary paging group(s) and secondary paging group(s).

In one embodiment, an MS is assigned zero or more primary paging groups, and one or more secondary paging groups. This is different from the previous approach where each MS has at most one primary paging group.

In a particular embodiment, when an MS in idle-mode operation enters a primary paging area, the MS determines if a timer is running. If the timer is running, the MS stops the Timer. If the current primary paging area is different from the last primary paging area, the MS performs a location update and monitors the new PG ID of the current primary paging area. If the current primary paging area is the same as the last primary paging area, the MS monitors the PG ID of the current primary paging area, which is the same as that of the previous paging area. If the timer is not running, the MS performs a location update and monitors the PG ID of the current primary paging area.

This embodiment is different from the previous approach in that it supports the scenario where the MS has multiple primary paging groups. In this case, when the MS leaves from one primary paging area and enters another primary paging area directly, the MS performs a location update to inform the paging controller. The MS could linger in a secondary paging area for some time after leaving a primary paging area and enters another primary paging area before the expiration of the timer, in such a case, the MS performs a location update just as before. Also, the MS starts the timer when the MS leaves a primary paging area. If the MS returns to the previous primary paging area before the timer expires, the MS stops the timer, but does not need to perform a location update. When the timer expires, the MS performs a location update.

Figure 6:
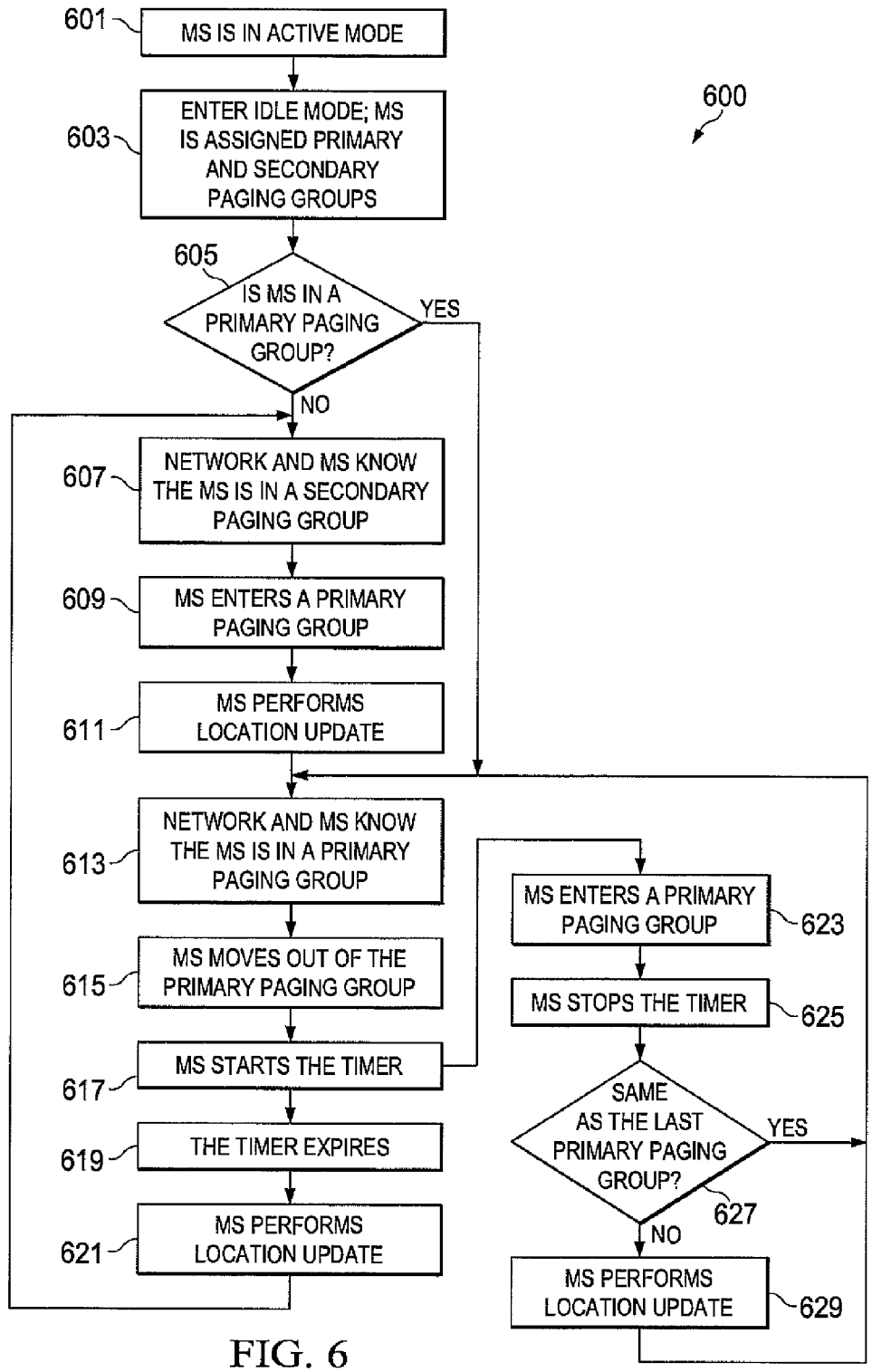
FIG. 6 illustrates a method of operating an idle mode according to an embodiment of this disclosure.

FIG. 6 illustrates a method 600 of operating an idle mode according to an embodiment of this disclosure.

As shown in FIG. 6, an MS in active mode (block 601) enters idle mode and is assigned primary and secondary paging groups by a paging controller (block 603). The network then determines if the MS is currently in a primary paging group (block 605). The network deems the MS to be in a primary paging group if the MS has informed the network with a location update that the MS has entered a primary paging group and the MS has not informed the network regarding its exit of the primary paging group. If the MS is not determined to be in a primary paging group, the network and the MS know that the MS is in a secondary paging group (block 607). The MS then enters a primary paging group (block 609) where the MS performs a location update (block 611).

The network and the MS now know that the MS is in a primary paging group (block 613). The MS then moves out of the primary paging group (block 615) and starts a timer (block 617). If the MS has not entered a primary paging group before the timer expires (block 619), the MS performs a location update (block 621) that lets the network and the MS know that the MS is in a secondary paging group (block 607).

If the MS enters a primary paging group before the timer expires (block 623), the MS stops the timer (625). The MS then determines if the current primary paging group is the same as the last primary paging group (block 627). If the current primary paging group is the same as the last primary paging group, the MS does not perform a location update. Because no location update was performed, the network and the MS now assume that the MS is in the same primary paging group (block 613). It is possible that the MS may actually be in a neighboring secondary paging group while the network assumes that the MS is in the primary paging area if the MS has left the primary paging area and the timer has not expired. If the current primary paging group is not the same as the last primary paging group, the MS performs a location update (block 629) that allows the network and the MS to know that the MS is in a primary paging group (block 613).

Even though not explicitly shown in FIG. 6, the MS performs a location update when the MS enters a cell that carries none of the PG IDs that had been assigned to the MS. In this case, the network re-assigns the MS with a new set of PG IDs.

In another embodiment, the paging controller avoids having a primary paging group page the MS when the MS is not in this primary paging area. In this embodiment, the network determines the number of PG IDs that have been assigned to the MS. The network also determines whether the MS is in one of the primary paging areas. The network deems the MS to be in the primary paging area if the MS informed the network with a location update when the MS entered the primary paging area and the MS has not informed the network of an exit from the primary paging area.

If the MS is in a primary paging area with a PG ID_x, the network skips all of other primary paging areas and pages the MS in this primary paging group. All of the BSs with this PG ID_x page the MS in the pre-determined paging offset starting at the beginning of the current paging cycle. If a response is received from the paged MS, the process is complete. Otherwise, the network continues to have the neighboring secondary paging areas page the MS. Only if all the attempts have failed in the current paging cycle, all of the BSs with this PG ID_x page the MS in the pre-determined paging offset starting at the beginning of the next paging cycle.

If the MS is determined to be among the secondary paging groups, the network determines the PG ID with the shortest paging offset and has all of the BSs with this PG ID page the MS in the paging offset starting from the beginning of the current paging cycle. If no response is received from the paged MS and if there are more secondary paging groups, the network determines the PG ID with the second shortest paging offset and has all of the BSs with this PG ID page the MS in the paging offset starting from the beginning of the current paging cycle. If no response is received from the paged MS, the network continues the paging process in the order of increasing paging offset until all the PG IDs are exhausted in the current paging cycle.

In some embodiments, the paging controller requests at most one primary paging group to page the MS because the system and method of this disclosure allow the paging controller to decide whether the MS is around one primary paging area, and the MS cannot be in two primary paging areas at the same time.

If there is no primary paging group assigned to the MS, the paging controller requires only the secondary paging groups to page the MS.

Even if the MS has been assigned one or more primary paging groups, if the paging controller is not informed that the MS is in one of the primary paging groups, the paging controller requests only the secondary paging groups to page the MS.

When paging the MS using the secondary paging groups, the paging controller pages the MS using the secondary paging groups in the order of increasing paging offsets.

In particular embodiments, the primary paging groups have paging offsets shorter than those of the secondary paging groups. All of the primary paging groups can use the same paging offset because at most only one of them will page the MS at any time.

Figure 7:
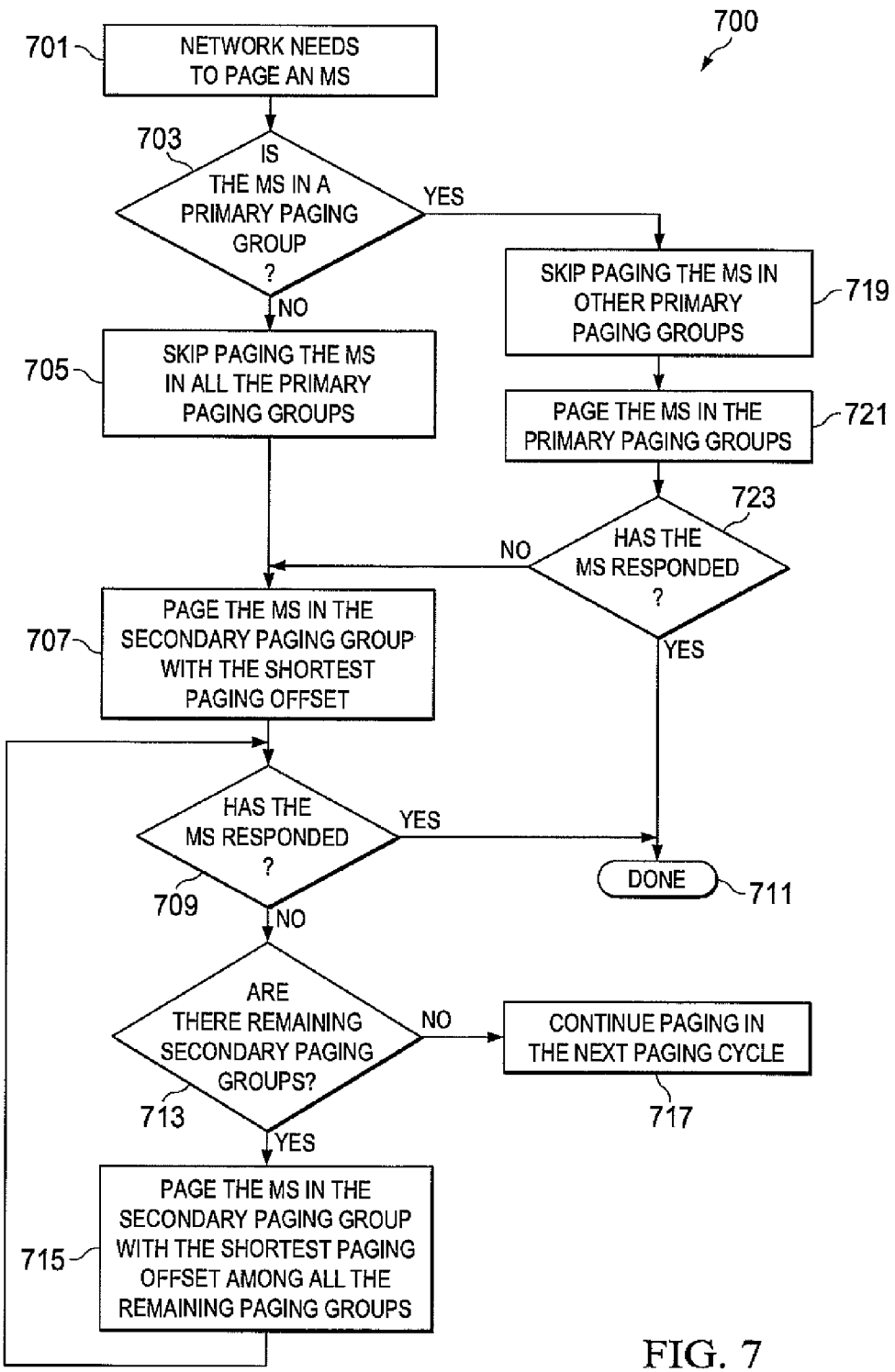
FIG. 7 illustrates a method of paging a mobile station according to an embodiment of this disclosure.

FIG. 7 illustrates a method 700 of paging a mobile station according to an embodiment of this disclosure.

As shown in FIG. 7, a network determines that an MS needs to be paged (block 701). The network then determines if the MS is in a primary paging group (block 703). If the MS is not in a primary paging group, the MS skips paging the MS in all of the primary paging groups (block 705) and pages the MS in the secondary paging group with the shortest paging offset (block 707). The network then determines if the MS as responded to the paging (block 709). If the MS has responded, the paging process is complete (block 711). If the MS has not responded, the network determines if there are any remaining secondary paging groups (block 713). If there are any remaining secondary paging groups, the network pages the MS in the secondary paging group with the shortest paging offset among all of the remaining secondary paging groups (block 715) and determines if the MS has responded to the page (block 709). If there are no remaining secondary paging groups, the network continues paging in the next paging cycle (block 717).

If the MS is in a primary paging group, the network skips paging the MS in the other primary paging groups (block 719) and pages the MS in the primary paging group with a PG ID_x (block 721). The network then determines if the MS has responded (block 723). If the MS has responded, the paging process is complete (block 711). If the MS has not responded, the network pages the MS in the secondary paging group with the shortest paging offset (block 707).

This disclosure provides two idle mode mechanisms.

The MS does not perform a location update as long as the MS is inside one of the paging groups that has been assigned to the MS. The consistency between the MS monitoring PG ID and the paging controller paging the MS guarantees that the MS is paged at most once in each paging cycle no matter which paging group the MS resides. There is minimum signaling overhead between the network and the MS.

The network also skips the primary paging groups when the network knows that the MS is not in one of those primary paging groups. This dramatically reduces the paging broadcast overhead in those primary paging groups. The complete location update procedure not only handles ping-pang effect using the timer, but also guarantees both the network and the MS know whether the MS is in a primary or a secondary paging group at any time.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of paging a subscriber station, the method comprising:
   when the subscriber station is in a first primary paging group, paging the subscriber station only in the first primary paging group, while refraining from paging the subscriber station in other primary paging groups;
   paging the subscriber station in a first secondary paging group which has a shortest paging offset, while refraining from paging the subscriber station in primary paging groups, when the subscriber station is in the first secondary paging group; and
   paging the subscriber station in a second secondary paging group which has a second shortest paging offset when the subscriber station fails to respond to the paging in the first secondary paging group,
   wherein the primary paging groups and secondary paging groups are assigned by a paging controller and each primary paging group is associated with a different geographical area associated with a user of the subscriber station.

2. The method in accordance with claim 1, further comprising:
   paging the subscriber station in the first secondary paging group with the first shortest paging offset when the subscriber station fails to respond to the paging in the first primary paging group.

3. The method in accordance with claim 1, further comprising:
   determining whether the subscriber station is in a first primary paging group.

4. The method in accordance with claim 1, further comprising:
   paging the subscriber station in a next paging cycle when there are no remaining secondary paging groups.

5. The method in accordance with claim 3, further comprising:
   skipping a paging of the subscriber station in all primary paging groups upon a determination that subscriber station is not in a first primary paging group.

6. The method in accordance with claim 1, wherein the first primary paging group is associated with a housing community where a subscriber lives or an office complex where the subscriber works.

7. The method in accordance with claim 1, further comprising:
   determining that the subscriber station needs to be paged.

8. A wireless communication network comprising a plurality of devices, each of the devices comprising a paging controller capable of communication with a plurality of base stations within a coverage area of the network, wherein at least one paging controller is configured to:
   when a subscriber station is in a first primary paging group, page the subscriber station only in the first primary paging group and refrain from paging the subscriber station in other primary paging groups;
   page the subscriber station in a first secondary paging group which has a shortest paging offset and refrain from paging the subscriber station in primary paging groups when the subscriber station is in the first secondary paging group; and
   page the subscriber station in a second secondary paging group which has a second shortest paging offset when the subscriber station fails to respond to the paging in the first secondary paging group,
   wherein the primary paging groups and secondary paging groups are assigned by a paging controller and each primary paging group is associated with a different geographical area associated with a user of the subscriber station.

9. The wireless communication network in accordance with claim 8, wherein the at least one of the plurality of paging controllers is further configured to:
   page the subscriber station in the first secondary paging group with the first shortest paging offset when the subscriber station fail to respond to the paging in the first primary paging group.

10. The wireless communication network in accordance with claim 8, wherein the at least one of the plurality of paging controllers is further configured to:
    determine whether the subscriber station is in a first primary paging group.

11. The wireless communication network in accordance with claim 8, wherein the at least one of the plurality of paging controllers is further configured to:
    page the subscriber station in a next paging cycle when there are no remaining secondary paging groups.

12. The wireless communication network in accordance with claim 10, wherein the at least one of the plurality of paging controllers is further configured to:
    skip paging the subscriber station in all primary paging groups upon a determination that subscriber station is not in a first primary paging group.

13. The wireless communication network in accordance with claim 8, wherein the first primary paging group is associated with a housing community where a subscriber lives or an office complex where the subscriber works.

14. A device comprising a paging controller configured to:
when a subscriber station is in a first primary paging group, page the subscriber station only in the first primary paging group and refrain from paging the subscriber station in other primary paging groups;
page the subscriber station in a first secondary paging group which has a shortest paging offset and refrain from paging the subscriber station in primary paging groups when the subscriber station is in the first secondary paging group; and
page the subscriber station in a second secondary paging group which has a second shortest paging offset when the subscriber station fails to respond to the paging in the first secondary paging group,
wherein the primary paging groups and secondary paging groups are assigned by a paging controller and each primary paging group is associated with a different geographical area associated with a user of the subscriber station.

15. The device in accordance with claim 14, wherein the paging controller is further configured to:
page the subscriber station in the first secondary paging group with the first shortest paging offset when the subscriber station fail to respond to the paging in the first primary paging group.

16. The device in accordance with claim 14, wherein the paging controller is further configured to:
determine whether the subscriber station is in a first primary paging group.

17. The device in accordance with claim 14, wherein the paging controller is further configured to:
page the subscriber station in a next paging cycle when there are no remaining secondary paging groups.

18. The device in accordance with claim 16, wherein the paging controller is further configured to:
skip paging the subscriber station in all primary paging groups upon a determination that subscriber station is not in a first primary paging group.

19. The device in accordance with claim 14, wherein the first primary paging group is associated with a housing community where a subscriber lives or an office complex where the subscriber works.

20. The device in accordance with claim 14, wherein the paging controller is further configured to determine that the subscriber station needs to be paged.

* * * * *